United States Patent [19]

O'Dell

[11] 4,158,132

[45] Jun. 12, 1979

[54] LIGHTING-CONTROL SYSTEM WITH CUE-LEVEL CONFIRMATION

[75] Inventor: Kenneth A. O'Dell, Newport, Oreg.

[73] Assignee: Electronics Diversified, Inc., Hillsboro, Oreg.

[21] Appl. No.: 815,584

[22] Filed: Jul. 14, 1977

[51] Int. Cl.[2] .................... G01J 1/32

[52] U.S. Cl. .................... 250/205

[58] Field of Search .................... 250/205, 214

[56] References Cited

U.S. PATENT DOCUMENTS 3,986,022 10/1976 Hyatt .................... 250/205

*Primary Examiner*—David C. Nelms

*Attorney, Agent, or Firm*—Kolisch, Hartwell, Dickinson & Stuart

[57] ABSTRACT

A stored-cue lighting-control system for controlling the illumination of a selected space, such as a stage. The system includes a photodetector for following the level of illumination in the space. During storing of cue data associated with a particular cue, related data, regarding the level of illumination intended to be produced by the cue, is also stored. During functioning of the system to place different successive cues in the space, the stored illumination level data is compared with current real-time data reflecting the actual illumination level then being produced in the space. An indicator signals any difference noted as a result of this comparison.

4 Claims, 1 Drawing Figure

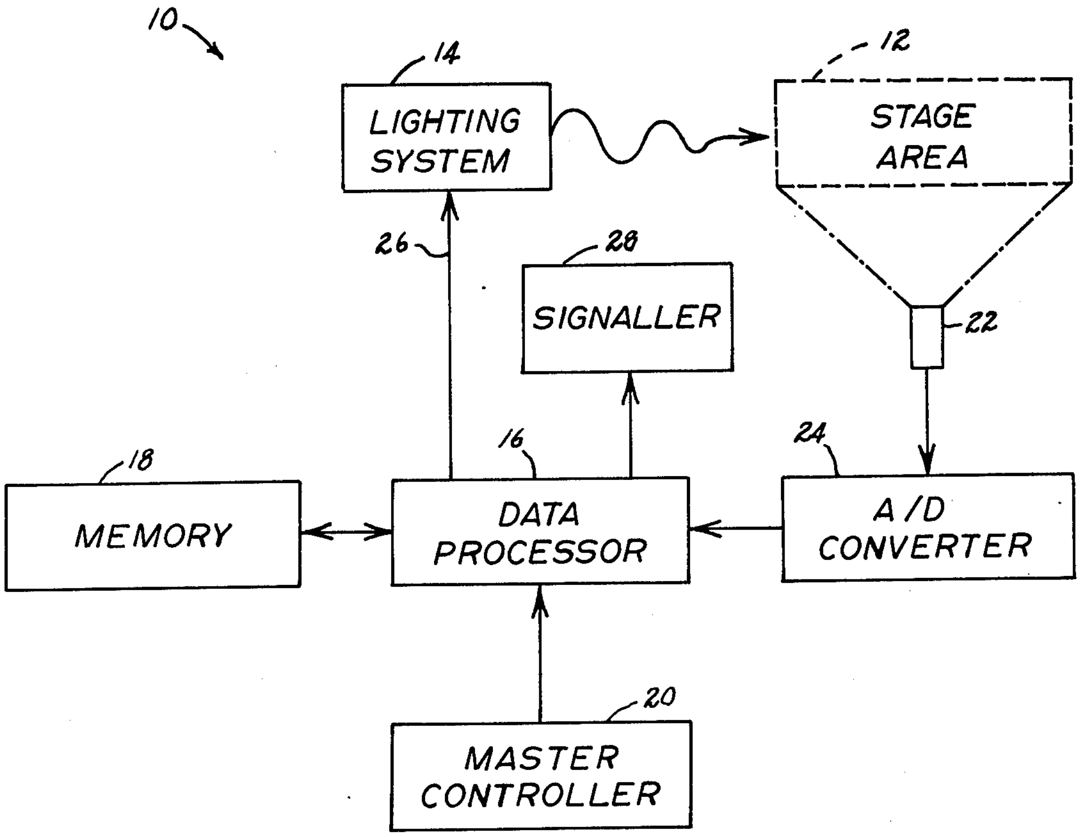
10
14
LIGHTING SYSTEM
12
STAGE AREA
26
28
SIGNALLER
22
18
MEMORY
16
DATA PROCESSOR
24
A/D CONVERTER
20
MASTER CONTROLLER

LIGHTING-CONTROL SYSTEM WITH CUE-LEVEL CONFIRMATION

BACKGROUND AND SUMMARY OF THE INVENTION

The present invention pertains to a lighting control system, and more particularly, to such a system which includes apparatus designed to provide cue-level performance confirmation.

Automated and/or semiautomated lighting-control systems are becoming today more widely used in connection with controlling the illumination in a space, such as a stage. Such a system typically employs a computer which works in conjunction with master control apparatus, such as a typewriter-like keyboard, to allow for sequential storage of the different so-called lighting "cues" which are intended to be used during a performance.

More specifically, in the use of such a system, an operator of the system, under the supervision of a lighting director, adjusts the intensity levels of different specified lights during the setting up of a particular lighting cue. This is done, for example, through keyboard communication with the computer to indicate which lights are to be set at which levels. When the director is satisfied with the illumination level, and the nature of a particular cue, and so instructs the system operator, the latter instructs the computer to store in a memory data exactly reflecting the illuminated conditions of the different lights. This procedure is repeated for all of the different cues that are to be used during a performance, and the computer is instructed as to the appropriate sequence for the cues.

During an actual performance, the system operator, again under supervision, and through communication with the computer by way of the keyboard, "calls up" the different successive cues as required by his directions. These cues are "called forth" from the computer's memory, and the latter provides all of the appropriate control signals to turn on the appropriate lights at the appropriate intensity levels. Where fading in and out is required, this may be performed either manually or automatically.

Ideally, and during a performance, the different successive cues exactly repeat what was established for the cues at the time that they were intially set up and stored in computer memory. As a practical matter, however, it sometimes occurs that the actual intensity of a lighting cue during a performance is higher or lower than that expected, by virtue of a change in line voltage, or in some cases by the fact that one or more lamps are dead. Often, this situation is not detected by the people directing the performance, or at least not in time to make a correction.

A general object of the present invention is to provide a lighting-control system which obviates this difficulty in a practical and satisfactory manner.

More specifically, an object of the invention is to provide a system which affords the capability, during setting up of a lighting cue, of monitoring the light-intensity level produced by the cue, with this information stored in computer memory and related to the particular cue.

A further object of the invention is to provide a system of the type so far generally outlined in which, during an actual performance, the data stored in computer memory reflecting the expected intensity levels of the different cues are compared, on a continuous basis, with the actual intensity levels produced by the real-time cues as they are called into being. This comparison is used to generate a signal which, at the very least, will simply tell a system operator whether the light intensity is too great or too small, so that he can make an instantaneous correction. A somewhat more sophisticated system utilizes this kind of signal to effect, through computer control, an automatic adjustment in cue intensity level.

Thus, a preferred embodiment of the invention comprises a stored-cue lighting-control system for controlling the illumination of a selected space, such as a stage. A photodetector is provided in the system for following the level of illumination in at least a selected portion of the space. During storing of cue data associated with a particular lighting cue, related data, regarding the level of illumination intended to be produced by the cue, is also stored. During functioning of the system to place different successive cues in the space, the stored illumination data is compared with current real-time data reflecting the actual illumination level then being produced in the space. An indicator in the system signals any difference noted as a result of this comparison. In a simple form of the invention, this signal tells an operator whether intensity level is too high or too low, and allows for immediate correction. In a more sophisticated version, this signal effects automatic computer correction of the condition.

These and other objects and advantages which are attained by the invention will become more fully apparent as the description which now follows is read in conjunction with the accompanying drawing which is a block diagram of the proposed system.

DETAILED DESCRIPTION OF THE INVENTION

Turning now to the drawing, indicated generally at 10 is a lighting-control system constructed in accordance with the present invention. System 10 is installed to control the lighting of a stage area, designated by dashed block 12, through controlling the various lamps, and intensities thereof, in a conventional multiple-lamp dimmer-energized lighting system, designated by block 14. The various means making up lighting system 14 are completely conventional, and are well understood by those skilled in the art. In general terms, this system includes what are known as dimmers to which control voltages are applied to affect the lit-up intensities of different lamps in the system connected to the dimmers.

Also included in system 10 is a conventional digital data processor 16 which is a commercially available unit, programmable to perform its intended function in a variety of ways well known to those skilled in the art. Working in conjunction with processor 16 are a digital data memory, or storage means, 18, and a master controller 20. Memory 18 is also of conventional construction, and is coupled to the data processor in a well known way. Master controller 20, in system 10, includes a digital-data-transmitting keyboard for communicating with the data processor, as well as a catnode ray tube monitor, also for communicating with the data processor. A number of commercially available units, especially designed for lighting control purposes, are available including units like memory 18, processor 16 and controller 20. For example, a commericially available system employing these units has been made by Electronics Diversified, Inc., Hillsboro, Oregon, which system is sold under the name LS-8 Lighting System. Another similar system, also made by Electronics Diversified, Inc., is offered under the name OMNI 3000 System.

Also included in system 10, in accordance with a significant feature of the present invention, is a stage-area illumination monitoring means, taking the form of conventional photodetector 22 which is arranged to view at least a portion of stage area 12. With a lighting cue projected onto the stage area, the photodetector produces an analog electrical DC signal whose level is directly related to the intensity of the cue in the stage area. This analog signal is fed in system 10 to a commercially available analog-to-digital converter which is coupled in a well known manner to data processer 16.

A cable of lighting control output conductors 26 interconnects data processor 16 and lighting system 14. Also connected to the data processor is what is referred to herein as a signaling means, such being represented by a block 28 in the FIGURE.

Considering now the operation of system 10, during the setting up of a particular lighting cue, the system operator works through master controller 20, and under the supervision of a lighting director, to turn on different specific lamps in the system to intensity levels decided upon by the director. During this process, photodetector 22 monitors the levels of illumination on the stage area, and transmits to the analog-to-digital convertor an analog DC signal directly reflecting this illumination level. Convertor 24 simultaneously converts this analog signal to a related digital signal which is made available to an input port of processor 16.

When the lighting director is satisfied with the particular cue, and so instructs the system operator, the latter operates controller 20 so as to instruct the data processor to store data in memory 18 enabling automatic recalling of this cue at a later time. When this occurs, and also through the operation of the master controller and the program stored in the processor and memory for operating the former, the digital data then presented by the analog-to-digital converter, which data is directly indicative of the expected or desired illumination level to be produced by the cue, also is stored in memory 18. In particular, this data is stored so as to be directy identifiable as being relatable to the particular cue which is then being stored.

This type of operation continues as successive cues for a performance are set up. Accordingly, and during the set-up procedure, the system, in addition to storing cue data in memory 18, also stores related cue illumination level data, the two related data forming, for each are, a data pair.

During performance of system 10 to place different cues onto stage area 12, as each cue is called up, so also called up is the data indicating the intended illumination level related to the cue. Photodetector 22 continues to provide instantaneous monitoring of the actual or real-time stage area illumination level, which information, through the operation of convertor 24, continuously provides processor 16 with digital data reflective of real-time illumination level. Through the functioning of the program used by the processor, and on a real-time basis, stored illumination data for a cue is compared continuously with the real-time illumination data, and any difference which is noted, which difference indicates that the actual illumination level is either too high or too low, is so indicated by signaler 28. In the embodiment of system 10 illustrated herein, signaler 28 is designed to tell the operator whether the light level is too high or low, so that he can, through the operation of the master controller, effect an immediate correction. Details of construction of signaler 28 are not critical, and so, have not been shown. A simple form of practical signaler includes a pair of lights, one of which lights up to indicate a too-bright condition, and the other of which lights up to reflect a too-dim condition.

A useful modification of the system takes advantage of the comparison signal just described as a means for instructing the data processor to effect an automatic light-level correction. Those skilled in the art are aware of what kind of programming is necessary to accomplish this. Other modifications of the system could include arrangements, for example, of multiple photodetectors each looking at a somewhat different portion of the stage area, signals from which may be used to effect selected-area illumination correction during a performance.

All of the programming which is used to effect the performances just described for the data processor, is available in various forms, and is well within the skill of those skilled in the art.

While a preferred embodiment and several modifications of the invention have been described herein, it is appreciated that other variations and changes may be made without departing from the point of the invention.

It is claimed and desired to secure by Letters Patent:

1. In a system for controlling, through the use of lighting cues, of illumination in a designated space, where the system includes storage means and means for placing therein cue data related to different lighting cues,
   - means disposed adjacent said space for monitoring the instantaneous level of illumination therein, and for producing from such monitoring, illumination data directly related to such monitored level,
   - means operatively interconnecting such storage means and said monitoring means operable, during the storage of cue data related to a particular lighting cue, to store in said storage means the illumination data associated with such cue, and further operable, during functioning of the system to control the illumination in said space, to compare, for each cue, the stored associated illumination data therefor with the instantaneous illumination data then produced by said monitoring means, and
   - signaling means operatively connected to said interconnecting means, operable, during the making of such a comparison, to indicate the existence of any difference in the compared data.

2. The system of claim 1, wherein said interconnecting means includes a digital data processor.

3. The system of claim 2, wherein said monitoring means includes light-sensitive means positioned to view at least a portion of said space, and operable to produce a DC electrical signal related to the level of light viewed in said portion, and means operatively coupling said light-sensitive means and said interconnecting means for converting such a DC signal into related digital data.

4. A method for controlling, through the use of lighting cues, the level of illumination in a designated space, comprising
   - storing pairs of first and second data, with said first data of each pair being related to a lighting cue and said second data being related to a monitored illumination level of said cue, respectively,
   - selectively retreiving one of said pairs to produce from the associated first data, the associated lighting cue, and
   - comparing data related to the actual illumination level of said cue with the associated second data of the retrieved pair.

* * * * *

UNITED STATES PATENT AND TRADEMARK OFFICE

CERTIFICATE OF CORRECTION

PATENT NO. : 4,158,132

DATED : June 12, 1979

INVENTOR(S) : Kenneth A. O'Dell

It is certified that error appears in the above-identified patent and that said Letters Patent are hereby corrected as shown below:

In column 4, line 25, after "cues," insert --the level--.

Signed and Sealed this

*Fifteenth* Day of *April 1980*

[SEAL]

*Attest:*

SIDNEY A. DIAMOND

*Attesting Officer* *Commissioner of Patents and Trademarks*